United States Patent [19]

Holton

[11] Patent Number: 4,834,603
[45] Date of Patent: May 30, 1989

[54] STUD AND STUD RETAINING FASTENER ASSEMBLY

[75] Inventor: Robert J. Holton, North Caldwell, N.J.

[73] Assignee: Eaton Corporation, Cleveland, Ohio

[21] Appl. No.: 133,170

[22] Filed: Dec. 11, 1987

Related U.S. Application Data

[63] Continuation of Ser. No. 13,173, Feb. 8, 1987, abandoned, which is a continuation of Ser. No. 507,996, Jun. 27, 1983, abandoned, which is a continuation of Ser. No. 288,276, Jul. 30, 1981, abandoned, which is a continuation of Ser. No. 793,338, May 3, 1977, abandoned.

[51] Int. Cl.$^4$ .............................................. F16B 21/18
[52] U.S. Cl. ................................. 411/521; 411/517; 411/533; 411/918
[58] Field of Search .................. 411/516-521, 411/531, 533, 548, 437; 72/335, 336; 10/86 R, 86 B; 29/522, 525, 411, 918

[56] References Cited

U.S. PATENT DOCUMENTS

| | | | |
|---|---|---|---|
| 1,460,749 | 7/1923 | Dull | 411/531 |
| 1,675,277 | 6/1928 | Roe | 411/533 |
| 1,752,982 | 4/1930 | Herold | 411/517 |
| 2,831,388 | 4/1958 | Collins et al. | 411/437 |
| 3,108,371 | 10/1963 | Munse | 411/437 |
| 3,481,381 | 12/1969 | Black | 10/86 B |

Primary Examiner—Neill R. Wilson
Attorney, Agent, or Firm—A. E. Chrow

[57] ABSTRACT

An improved, thin walled fastener for retaining studs, rods, or the like is provided. The fastener is of the push-on type comprising a one-piece, generally thin, stamped sheet metal resilient body defining a generally centrally located stud retaining aperture for receipt and retention of studs, rods or the like. The body is preferably generally frusto-conical or dome shaped in cross section. The fastener is formed by punching or shearing a hole in a blank and then forming a generally dome shaped impression in the blank, the impression being generally coaxial with the axis of the punched hole. The required transverse extensions of the body are minimized by the utilization of the relatively smooth continuous edge of the punched hole rather than the burred edge of a punched hole as the stud retaining edge of the fastener stud retaining aperture.

1 Claim, 1 Drawing Sheet

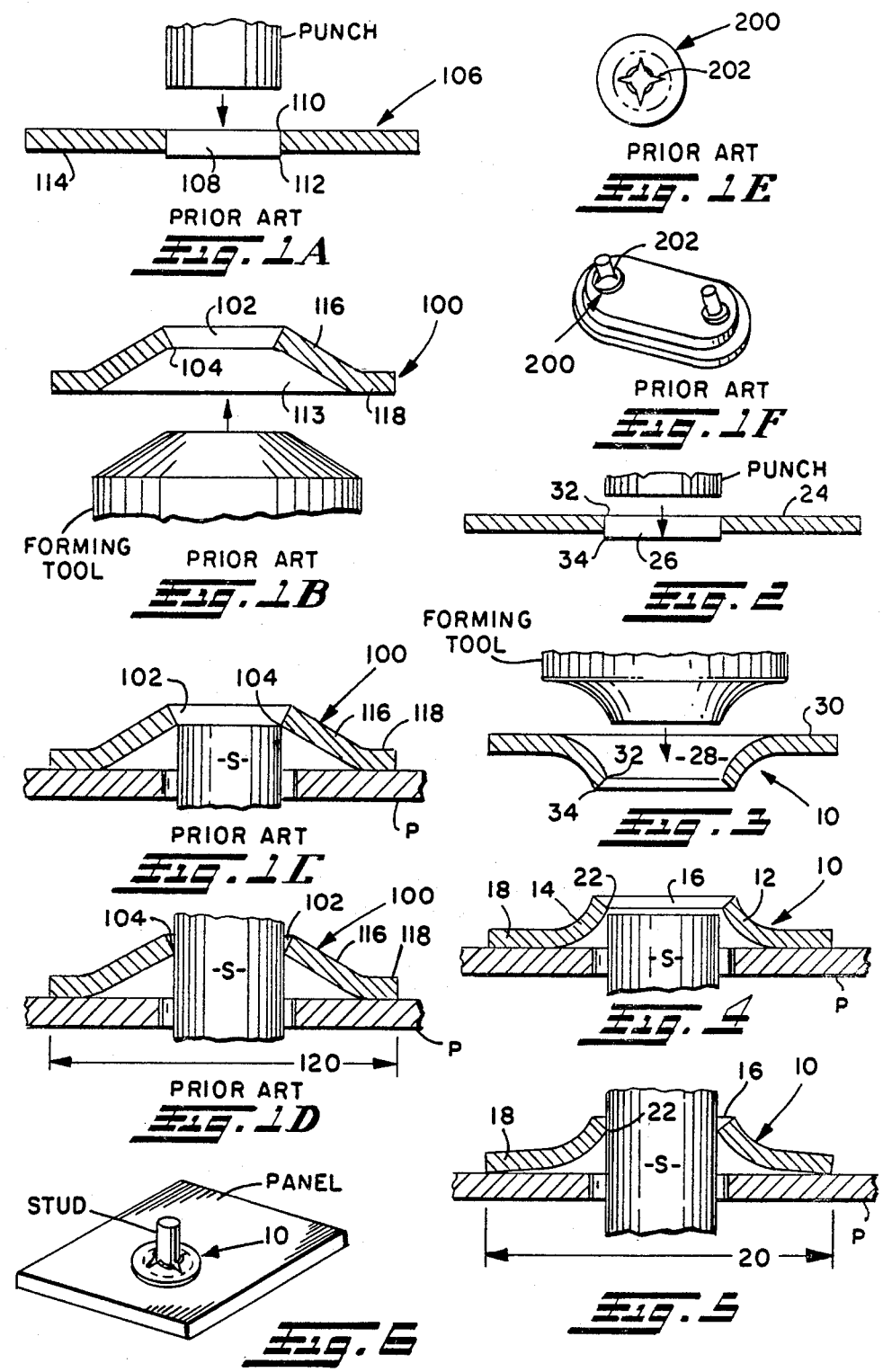

STUD AND STUD RETAINING FASTENER ASSEMBLY

This application is a continuation of application Ser. No. 013,173, filed 2/9/87, now abandoned, which is a continuation of Ser. No. 507,996, filed 6/27/83, now abandoned, which is a continuation of Ser. No. 288,276, filed 7/30/81, now abandoned, which is a continuation of Ser. No. 793,338, filed 5/3/77, now abandoned.

BACKGROUND OF THE INVENTION

1. Field of the Invention

This invention relates to one-piece, stamped sheet metal, push-on stud retainers and in particular relates to relatively thin walled, one-piece, stamped sheet metal push-on stud retainers having minimal transverse dimensions and utilizing the relatively smooth continuous edge of a punched or pierced hole as the stud retaining edge of the stud retaining aperture.

2. Description of the Prior Art

One-piece, stamped sheet metal, thin walled stud retaining fasteners of the push-on type are well known in the prior art. Examples of such prior art devices may be seen by reference to U.S. Pat. Nos. 2,975,667, issued Mar. 21, 1961; 2,986,060, issued May 30, 1961; 3,032,807, issued May 8, 1962; and 3,108,371, issued Nov. 29, 1963. Many of the prior art devices were formed by punching or piercing an aperture into a sheet metal blank and then slotting or slitting the edges of the punched aperture to provide a stud retaining aperture having a plurality of stud retaining fingers. Other prior art devices were formed by punching or piercing a hole into a sheet metal blank from a first direction and then forming a generally dome shaped impression from the other direction to achieve a fastener having a generally frusto-conical cross-sectional shape. The forming of the generally dome shaped impression from the direction opposite the direction of the punching of the hole assured that the "burr edge" of the punched hole was the stud retaining edge of the stud retaining aperture. The above mentioned U.S. Pat. No. 3,108,371, at Column 4, lines 37 to 51, is an example of such a so-called "reverse formed" stud retaining fastener. Other prior art devices utilized a swaging operation to assure that the stud retaining edge of the stud retaining aperture was given a rough, biting surface. The prior art stud retaining fasteners operated by frictionally gripping the exterior side walls of a retained stud. Such prior art devices usually resisted attempts to remove the stud by bitingly penetrating the outer edge of said studs. While such prior art stud retaining fasteners were generally suitable for most applications, the present tendency to use such fasteners in so-called miniature and/or microminiature devices has led to an attempt to minimize the outer transverse dimensions of said fasteners. Reduction of the transverse dimension of such fasteners will allow the retention of studs on closer centerlines. Such attempts to minimize the other transverse dimensions have been relatively unsuccessful as the prior art push-on fasteners have utilized a stud retaining aperture having a rough biting edge or burred edge and/or a slotted or slitted edge to provide the stud engaging edge of such fasteners. The use of such burred edge and/or slitted edge has prevented attempts to minimize the outer dimensions of said prior art fasteners as the burred and/or slitted edges contained many cracks, discontinuations and/or irregularities therein which has resulted in cracking and/or other failure of the fastener body unless at least a predetermined minimal outer dimension thereof was provided.

SUMMARY OF THE INVENTION

In accordance with the present invention, many of the drawbacks of the prior art devices have been overcome by the provision of an improved, one-piece, thin walled, stamped sheet metal, push-on stud retaining fastener having a minimized outer transverse dimension. The above is accomplished by utilizing the relatively smooth continuous edge of a hole punched or pierced in the sheet metal blank rather than the burred edge of the hole punched in the sheet metal blank as the stud retaining edge of the stud retaining aperture of the fastener. Applicant has discovered that when the dome shaped impression is formed in the sheet metal blank after the hole is punched therein from the same direction as the direction from which the hole was punched, the relatively smooth edge of the punched hole is compressingly formed into a strong, sharp, relatively uninterrupted, continuous edge. Such a strong, sharp, continuous edge is considerably more resistant to cracking and/or other failure than is a burred edge or a slitted edge and thus reduces the requirement for material at the transverse extremities of the fastener body to prevent cracking or other failure thereof.

Accordingly, it is an object of the present invention to provide an improved push-on stud retaining fastener of the thin walled type.

It is a further object of the present invention to provide an improved, one-piece, stamped sheet metal, push-on, stud retaining fastener of the thin walled type and a method for producing same wherein the outer transverse dimensions of said fastener are minimized.

It is another object of the present invention to provide an improved, one-piece, stamped sheet metal, push-on, stud retaining fastener of the thin walled type wherein the fastener is formed by punching or piercing a hole in a fastener blank and then forming a dome shaped depression into the blank to obtain the generally frusto-conical cross sectional shape of the fastener from the same side of the blank as the hole punching or piercing operation, the generally dome shaped depression having an axis generally coaxial with the axis of the punched hole.

These and other objects and advantages of the present invention will become apparent from a reading of the attached detailed description of the preferred embodiment taken in connection with the attached drawings.

BRIEF DESCRIPTION OF THE DRAWINGS

FIG. 1A is a schematic cross sectional illustration of a hole punching or piercing operation in a fastener blank utilized to produce one type of prior art fasteners.

FIG. 1B is a schematic cross sectional illustration of the dome shaped depression forming operation whereby the generally frusto-conical cross section of one type of the prior art fasteners was provided.

FIG. 1C is a cross sectional illustration of the prior art fastener produced by the method illustrated in FIGS. 1A and 1B about to receive a stud.

FIG. 1D is a cross sectional illustration of the prior art fastener of FIG. 1C as receiving and retaining a stud in the fully assembled position.

FIG. 1E is a top view of another type of prior art fastener.

FIG. 1F is a perspective view of the fastener of 1E utilized to retain a stud to a panel.

FIG. 2 is a cross sectional schematic illustration of the first step in producing a fastener in accordance with the present invention, said first step comprising punching or piercing a hole into the fastener blank.

FIG. 3 is a cross sectional schematic illustration of the second step in producing a fastener in accordance with the present invention, said second step comprises the forming of a generally dome shaped depression generally coaxial with the axis of the punched hole from the same side of the fastener blank as the hole punching operation.

FIG. 4 is a cross sectional illustration of the fastener of the present invention about to receive a stud.

FIG. 5 is a cross sectional illustration of the fastener of the present invention as retaining a stud in an apertured panel.

FIG. 6 is a perspective view of the push-on stud retaining fastener of the present invention as utilized to retain a stud in an apertured panel.

DESCRIPTION OF THE PREFERRED EMBODIMENT

Certain terminology will be used in the following description for convenience in reference only and will not be limiting. The words "up", "down", "top", "bottom", "upwardly", "downwardly", if used, will designate directions in the drawings to which such reference is made. Said terminology will include the words above specifically mentioned, derivatives thereof, and words of a similar import.

One piece, stamped, sheet metal, push-on stud retaining fasteners of the prior art and of the present invention both are, when utilized to retain a cross sectionally round stud, of a generally annular shape, having a generally centrally located annular stud retaining aperture, a generally frusto-conical annulus surrounding and defining the stud retaining aperture and a generally annular outer flange, the flange being generally perpendicular to the axis of the aperture. These devices are generally thin walled, that is, stamped from a relatively thin sheet of springy, hardened steel or stainless steel. The fasteners operate by frictionally gripping the outer edges of the stud.

The term "stud" as used herein is intended to mean an elongated member of generally constant cross-section, such as a rod, shaft, bar, wire or the like. For illustrative purposes only, the fasteners, and studs retained thereby, illustrated in this description will be shown as of a generally round crosssection. It is understood, however, that the fastener of the present invention is also intended and suitable for retention of studs having any cross-sectional shape.

The fastener 10 of the present invention may be seen as utilized to secure a stud, such as a metallic or ceramic stud, extending from an electrical component or the like, to an apertured panel by reference to FIG. 6. In a typical application of the present invention, the electrical lead of an electrical component is positively retained to a panel or a wire lead or terminal of an electrical component is retained to a panel prior to soldering thereof by use of the fastener of the present invention. The use of such fasteners is precision miniature and/or microminiature assembly requires that the transverse dimensions thereof, that is, the radius of the annular flanges, be minimized allowing the studs to be retained on closer centerlines.

Two types of prior art one-piece, stamped, sheet metal, push-on stud retaining fasteners may be seen by reference to FIGS. 1A through 1F. The first type of prior art fastener, that type utilizing the burred edge of a punched hole as the stud retaining edge of the stud retaining aperture, and the method of producing same, may be seen by reference to FIGS. 1A through 1D. The second type of prior art fastener, that type using a slotted or slitted stud retaining aperture, may be seen by reference to FIGS. 1E and 1F.

Referring now to FIGS. 1A through 1D, the method of producing and the utilization of a prior art, one-piece, stamped sheet metal push-on stud retaining fastener utilizing the burred edge of a punched or pierced hole as the stud retaining edge of the stud retaining aperture, will be described in more detail. As may be seen, the prior art fastener 100 will receive and retain a stud S in the stud retaining aperture 102 thereof. Specifically, the stud S is frictionally and/or bitingly engaged by the stud retaining edge 104 of the stud retaining aperture 102. The stud retaining edge 104 is the burred edge of a punched hole as will be described below in greater detail.

The prior art fastener 100 is formed by a method which is illustrated in FIGS. 1A and 1B. The fastener 100 is generally annular and is intended to receive and retain a stud S having a generally annular cross-section. The fastener 100 is produced by providing a generally annular sheet metal blank 106. The term "blank" as used herein is intended to include any portion of sheet metal suitable for formation into fasteners of the type described. The blank is placed in a blanking die, not shown, and a generally centrally located hole 108 is provided in the blank by punching out or piercing a generally annular section from the blank as is well known in the art. The punch contacts the blank from the top surface thereof and moves downwardly thru the metal blank to remove the annular section and then back upwardly as is well known in the stamping and blanking arts. The hole 108 is defined by an annular upper edge 110 and an annular lower edge 112. The upper edge 110 of the hole 108, that is, the edge on the surface first contacted by the punch and where the punch enters the metal, is relatively smooth and continuous, due to the compressing and compacting action of the punch, and is referred to as the smooth edge of the hole. By comparison, the bottom edge 112 of the hole where the punch breaks through the metal is relatively rough and discontinuous and extends beyond the bottom surface 114 of the blank. This bottom edge is generally referred to as the "burred" edge of the hole. The burred edge is considerably rougher, more irregular, and less continuous than the smooth edge of the hole. The generally frusto-conical shape of the prior art fastener body 100 is then completed by a forming operation illustrated in FIG. 1B. In this operation, a generally dome shaped impression 113 is formed in the blank from the bottom of the blank, or the opposite side from which the hole was punched from the blank. The generally dome shaped impression 113 is generally coaxial with the hole 108.

The resultant fastener 100 comprises a generally centrally located stud receiving aperture 102, a generally frusto-conical annulus 116 and surrounding and defining the stud receiving aperture 102, and a generally annular outer flange 118. Referring to FIGS. 1B through 1D, it may be seen that when the hole 118 is punched or pierced in the fastener blank 106 from the opposite side of the blank from which the dome shaped impression 113 is formed, the stud retaining edge 104, that is, the radially innermost edge of the aperture 102, of the fastener is the burred edge 112 of the punched hole. The use of the burred edge 112 of the punched hole 108 to provide the stud retaining edge 104 of the stud retaining aperture 102 of the prior art fasteners 100 resulted in such fasteners requiring a larger transverse dimension 120 due to the tendency of the burred edge 104 to crack, fracture, or otherwise fail. FIGS. 1C and 1D illustrate a stud S being inserted into and then retained by, respectively, the stud retaining edge 104 of the stud retaining aperture 102 of the prior art fastener 100.

Another form of prior art one-piece, stamped sheet metal, push-on stud retaining fastener is illustrated in FIGS. 1E and 1F. This type of fastener 200 utilizes a generally frusto-conically cross sectionally shaped stamped body having a slotted or slitted stud retaining aperture 202 therein.

Most of the prior art stud retaining fasteners, such as fasteners 100 and 200, utilize a stamped body having a generally frusto-conical annulus and a radially outwardly extending annular flange. The radius or transverse dimension of the outer flange must be of at least a minimal dimension to prevent cracking and/or breaking thereof. It has been found that the provisions of a slit and/or use of the burred edge of a stud retaining aperture increases the tendency of the frusto-conical annulus and the annular outer flange to crack and/or break and thus the outer flange must be of at least a predetermined minimal dimension to resist such cracking.

The methods of producing and the structural features of the improved, one-piece, stamped sheet metal stud retaining fastener 10 of the present invention may be seen by reference to FIGS. 2 through 6.

The stud retaining fastener 10 of the present invention comprises a generally resilient body 12 of relatively thin, stamped sheet metal. The body 12 comprises a frusto-conical annulus 14 defining a generally centrally located stud retaining aperture 16 and a radially outwardly extending annular flange 18 of transverse dimension 20. The stud retaining aperture 16 includes a radially inwardly extending stud retaining edge 22 which is adapted to engage and retain received studs. As will be discussed in greater detail below, the stud receiving edge 22 of the fastener 10 is the relatively smooth continuous edge of a hole punched in the blank used to produce the fastener 10.

As may be seen by reference to FIG. 2, the fastener 10 of the present invention is produced by providing a generally annular blank 24 and then punching or piercing a centrally located hole 26 therein. The blank 24 and the operation by which hole 26 is punched or pierced therein is similar to the operation in which blank 106 is provided with hole 108. However, as will be discussed in greater detail below, the structure of the fastener 10 of the present invention allows the use of a blank having a smaller diameter. As may be seen from FIG. 3, a forming tool is utilized to form a generally dome shaped impression 28 in the blank 24 which provides the fastener body 12 with a generally frusto-conical cross-sectional shape. It is noted that the generally dome shaped impression 28 is coaxial with the axis of the punched hole 26. It is further noted that the forming tool strikes the blank 24 from the top side 30 thereof which is the same side that the punching tool strikes the blank. By forming the generally dome shaped impression from the same side of the blank as the hole is punched from, the relatively smooth continuous upper edge 32 of the punched hole becomes the stud engaging edge rather than the relatively irregular burred edge 34 which is at the bottom of the punched hole 26. Also, as the dome shaped impression is formed, the relatively smooth continuous upper edge 32 is stretched which produces a strong sharp edge 32.

FIGS. 4 and 5 illustrate the fastener 10 of the present invention as about to receive and as assembled to a stud S, respectively, to retain the stud S to an apertured panel P.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

I claim:

1. A stud and stud retaining fastener assembly for retaining a stud to a member having an opening therethrough for receipt of said stud, said assembly comprising:

An axially extending stud having a generally cross-sectionally circular shank having an axial length sufficient to extend from one side of said member when inserted through said opening from the other side of said member; and a one-piece, stamped, sheet metal stud retaining fastener of substantially uniform thickness throughout and having an aperture surrounded by a continuous generally dome-shaped impression generally coaxial with the aperture, said aperture defined by continuous surrounding annular end surface of said impression having a relatively smooth continuous edge of smaller diameter frictionally engaging the stud shank and a generally burred edge of larger diameter normally not in contact with the stud shank, said retainer made by the method of;

providing a sheet metal blank of substantially uniform thickness, piercing said blank from one side with a punching tool to provide the aperture, and forming the dome-shaped impression by striking said blank with a dome-shaped forming tool from said one side generally coaxial with the aperture whilst maintaining the substantially uniform thickness throughout.

* * * * *